(12) United States Patent
Chiou et al.

(10) Patent No.: US 12,504,679 B2
(45) Date of Patent: Dec. 23, 2025

(54) LIGHTING SYSTEM AND PROJECTION DEVICE

(71) Applicant: Coretronic Corporation, Hsin-Chu (TW)

(72) Inventors: Shih-Chen Chiou, Hsin-Chu (TW); Yu-Hsiang Deng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 365 days.

(21) Appl. No.: 18/349,936

(22) Filed: Jul. 10, 2023

(65) Prior Publication Data
US 2024/0012320 A1   Jan. 11, 2024

(30) Foreign Application Priority Data
Jul. 11, 2022   (CN) .......................... 202210810951.X (51) Int. Cl.
*G03B 21/20* (2006.01)

(52) U.S. Cl.
CPC ....... *G03B 21/204* (2013.01); *G03B 21/2066* (2013.01); *G03B 21/208* (2013.01)

(58) Field of Classification Search
CPC .......................... G03B 21/204; G03B 21/2066; G03B 21/208; G03B 21/206; G03B 21/2013; G02B 27/141
USPC .......................................................... 353/99
See application file for complete search history.

(56) References Cited

U.S. PATENT DOCUMENTS

| | | | | |
|---|---|---|---|---|
| 11,531,261 | B2* | 12/2022 | Chien | G03B 21/2053 |
| 2019/0346752 | A1* | 11/2019 | Pan | G03B 21/204 |
| 2019/0353995 | A1* | 11/2019 | Pan | H04N 9/3155 |
| 2020/0019049 | A1* | 1/2020 | Liu | G02B 27/10 |
| 2020/0089091 | A1* | 3/2020 | Jao | G03B 21/2013 |
| 2021/0018824 | A1* | 1/2021 | Lin | G03B 21/2033 |
| 2021/0247677 | A1* | 8/2021 | Chen | G03B 21/204 |
| 2022/0197126 | A1* | 6/2022 | Hu | G03B 21/208 |

FOREIGN PATENT DOCUMENTS

| | | |
|---|---|---|
| CN | 108732851 | 11/2018 |
| CN | 113885282 | 1/2022 |

* cited by examiner

*Primary Examiner* — Magda Cruz
(74) *Attorney, Agent, or Firm* — JCIPRNET (57) ABSTRACT

A lighting system includes a first light source module providing a first light beam, a second light source module providing a second light beam, a beam splitting element with a first and a second side, a light condensing element, and a light homogenizing element. The beam splitting element guides the first portion of the first light beam to be output from the first side to be incident on the light homogenizing element and guides the second portion of the first light beam to be output from the second side to be incident on the light homogenizing element. The beam splitting element guides the first portion of the second light beam to be output from the first side to be incident on the light homogenizing element and guides the second portion of the second light beam to be output from the second side to be incident on the light homogenizing element.

21 Claims, 11 Drawing Sheets

LIGHTING SYSTEM AND PROJECTION DEVICE

CROSS-REFERENCE TO RELATED APPLICATION

This application claims the priority benefit of China application serial no. 202210810951.X, filed on Jul. 11, 2022. The entirety of the above-mentioned patent application is hereby incorporated by reference herein and made a part of this specification.

BACKGROUND

Technical Field

The disclosure relates to an optical system and an electronic device, and in particular relates to a lighting system and a projection device.

Description of Related Art

A projection device is a display device used to generate a large-scale projection image. With the evolution and innovation of science and technology, the technology of the projection device is constantly improving. The imaging principle of the projection device is that the lighting beam generated by the lighting system is converted into an image beam through a light valve, and then project the image beam to the projection target (such as a screen or a wall) through a projection lens to form a projection image.

At present, one of the common lighting system architectures is that laser light excites phosphors to generate excited light and RGB laser modules are disposed to provide supplementary light for correcting the color of the projection image. In this lighting system architecture, the position of the RGB laser module in the projection device faces the light integration rod, and red light is usually used as the supplementary light. Under the above architecture, in order to transmit light toward the light integration rod, dichroic mirrors typically is designed to allow blue light to pass therethrough and reflect red and/or green light. However, the wavelengths of the supplementary light emitted by the RGB laser module and the excited light partially overlap. If the conventional design is adopted, the red light and green light in the supplementary light are not able to pass through the dichroic mirror, however, if the transmittance of the dichroic mirror is changed, the energy loss of the excited light excited by the fluorescent wheel would be 20% to 30% and above. Therefore, the supplementary light and the excited light provided by the RGB laser module cannot be effectively utilized at the same time.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The present invention provides a lighting system and a projection device, which can improve the use efficiency of the light source.

The other objectives and advantages of the present invention can be further understood from the descriptive features disclosed in the present invention.

In order to achieve one of, or portions of, or all of the above objectives or other objectives, the present invention provides a lighting system for providing a lighting beam. The lighting system includes a first light source module, a second light source module, a beam splitting element, a light condensing element, and a light homogenizing element. The first light source module is used to provide a first light beam. The second light source module is used to provide a second light beam. The second light source module includes an excitation light source and a wavelength conversion element. The excitation light source is used to provide an excitation light beam. The wavelength conversion element is disposed on a transmission path of the excitation light beam, and is used to convert the excitation light beam into an excited light beam. The second light beam includes at least one of the excitation light beam and the excited light beam. The beam splitting element is disposed on a transmission path of the first light beam and the second light beam. The beam splitting element is a partially transmissive and partially reflecting element and has a first side and a second side opposite to each other. The beam splitting element is used to guide a first portion of the first light beam to be output from the first side and transmitted along a first light path to be incident on the light homogenizing element, and to guide a second portion of the first light beam to be output from the second side and transmitted along a second light path to be incident on the light homogenizing element. The beam splitting element is used to guide a first portion of the second light beam to be output from the first side and transmitted along the first light path to be incident on the light homogenizing element, and to guide a second portion of the second light beam to be output from the second side and transmitted along the second light path to be incident on the light homogenizing element. The light condensing element includes a central axis, and a first portion and a second portion located on both sides of the central axis. The first portion of the light condensing element is located on the first light path between the beam splitting element and the light homogenizing element. The second portion of the light condensing element is located on the second light path between the beam splitting element and the light homogenizing element. The light homogenizing element is used to output the lighting beam.

In order to achieve one of, or portions of, or all of the above objectives or other objectives, the present invention provides another projection device including the above-mentioned lighting system, at least one light valve, and a projection lens. At least one light valve is disposed on a transmission path of the lighting beam for converting the lighting beam into an image beam. The projection lens is disposed on a transmission path of the image beam to project the image beam out of the projection device.

Based on the above, the embodiments of the present invention have at least one of the following advantages or effects. In the lighting system and the projection device of the present invention, the lighting system includes a first light source module, a second light source module, a beam splitting element, a light condensing element and, a light homogenizing element. The first light source module and the second light source module respectively provide the first light beam and the second light beam and are respectively transmitted by the opposite first side and the second side of the beam splitting element to generate a transmissive portion and a reflecting portion. The first portion of the first light beam and the first portion of the second light beam are output from the first side and transmitted to the light condensing element along the first light path. The second portion of the first light beam and the second portion of the second light beam are output from the second side and transmitted to the opposite two portions of the light condensing element along the second light path, and subsequently may be symmetrically transmitted by the light condensing element to the light homogenizing element to output the lighting beam. In this way, through the cooperation of the above-mentioned optical elements, the lighting system can avoid the energy loss caused by disposing the dichroic mirrors on the paths of the first light beam and the second light beam under the optical structure with the fill light source, thereby improving the light emission efficiency and optical effect of the lighting system.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWING

The accompanying drawings are included to provide a further understanding of the invention, and are incorporated in and constitute a part of this specification. The drawings illustrate examples of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component "component is directly "adjacent to" "B" component or one or more additional components are between "A" component and "B" component. Accordingly, the drawings and descriptions will be regarded as illustrative in nature and not as restrictive.

Figure 1:
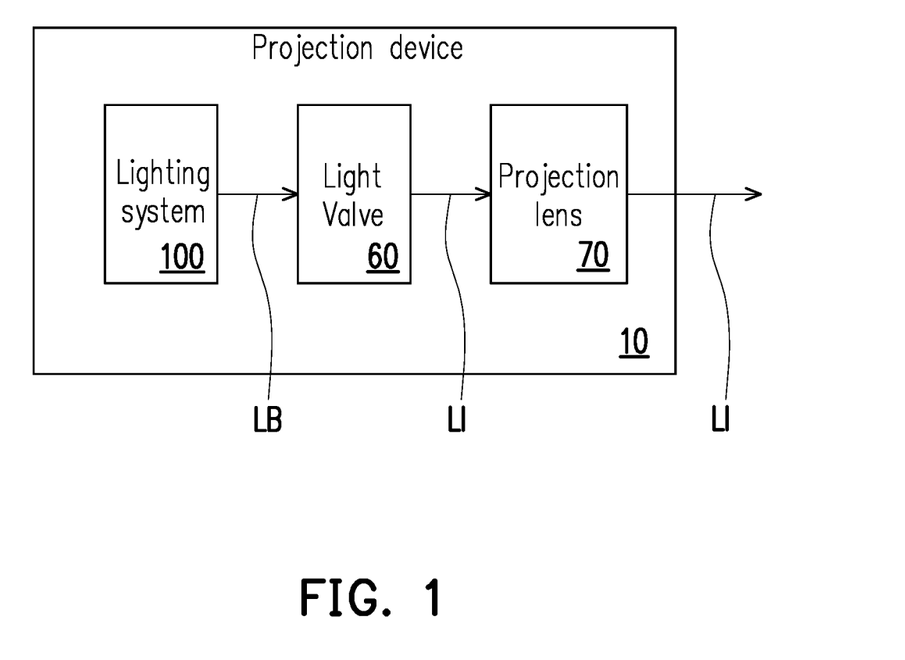
FIG. 1 is a schematic diagram of a projection device according to an embodiment of the present invention.

FIG. 1 is a schematic diagram of a projection device according to an embodiment of the present invention. Referring to FIG. 1, this embodiment provides a projection device 10 including a lighting system 100, at least one light valve 60, and a projection lens 70. The lighting system 100 is used to provide a lighting beam LB. The at least one light valve 60 is disposed on the transmission path of the lighting beam LB for converting the lighting beam LB into an image beam LI. The projection lens 70 is disposed on the transmission path of the image beam LI, and is used to project the image beam LI out of the projection device 10 to a projection target (not shown), such as a screen or a wall.

The light valve 60 is, for example, a reflective light modulator such as a liquid crystal on silicon panel (LCoS panel) and a digital micro-mirror device (DMD). In some embodiments, the light valve 60 may also be a transmissive optical modulator, such as a transparent liquid crystal panel, an electro-optical modulator, a magneto-optical modulator, or an acousto-optic modulator (AOM), etc. The present invention does not limit the form and type of the light valve 60. The detailed process and implementation for the light valve 60 to convert the lighting beam LB into the image beam LI can be obtained from general knowledge in the technical field with sufficient teaching, suggestion and implementation description, and therefore will not be repeated. In this embodiment, the number of light valves 60 is one, such as a projection device 10 using a single digital micro-mirror element (DMD), but in other embodiments there may be more than one light valves 220, and the present invention is not limited thereto.

The projection lens 70 includes, for example, a combination of one or more optical lenses with diopter, such as various combinations of non-planar lenses such as biconcave lenses, biconvex lenses, meniscus lenses, convex-concave lenses, plano-convex lenses, and plano-concave lenses. In an embodiment, the projection lens 70 may further include a flat optical lens to project the image beam LI from the light valve 60 to the projection target in a reflective manner. The present invention does not limit the form and type of the projection lens 70.

Figure 2:
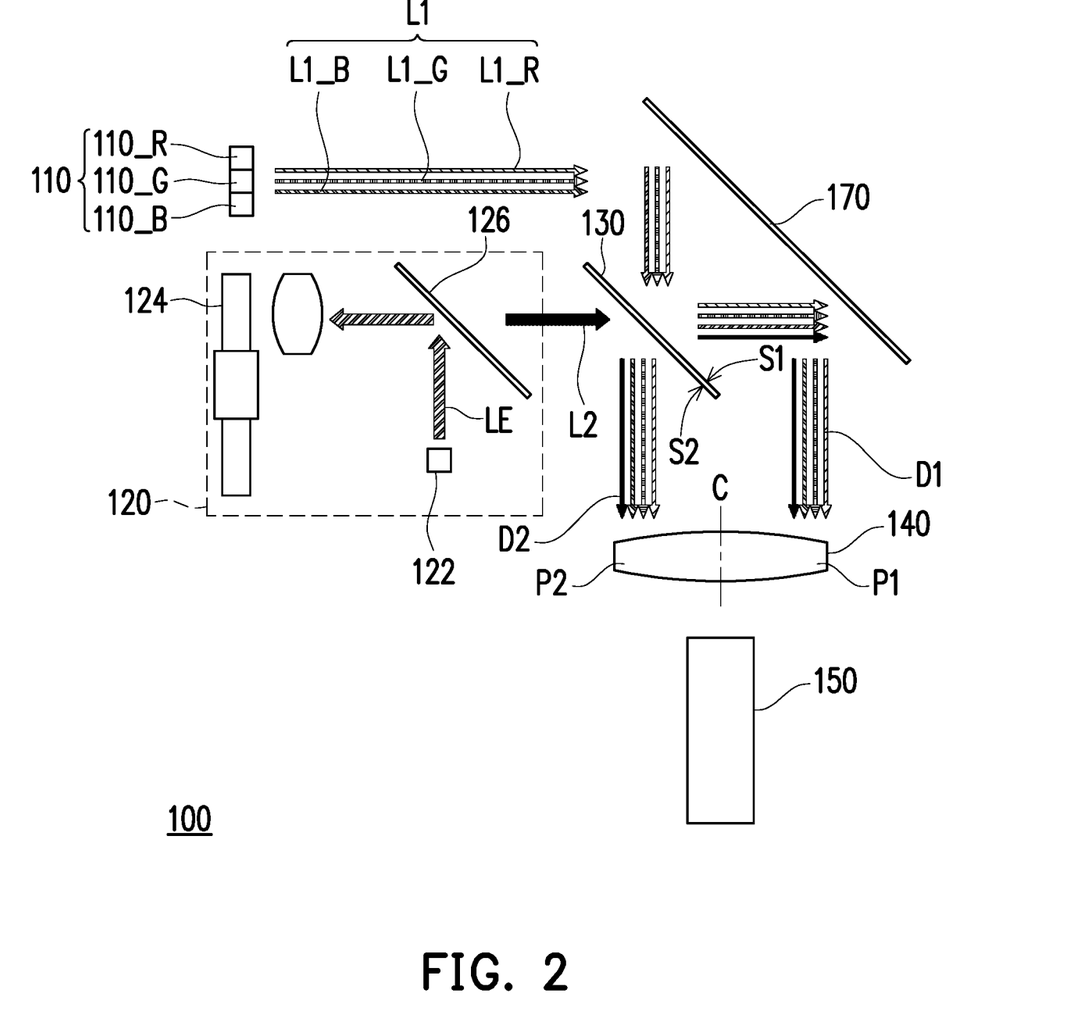
FIG. 2 is a schematic diagram of a lighting system according to an embodiment of the present invention.

FIG. 2 is a schematic diagram of a lighting system according to an embodiment of the present invention. Referring to FIG. 1 and FIG. 2, in this embodiment, the lighting system 100 includes a first light source module 110, a second light source module 120, a beam splitting element 130, a light condensing element 140, and a light homogenizing element 150. The first light source module 110 is used to provide a first light beam L1. The first light source module 110 includes, for example, at least one of the red light emitting element 110_R, the green light emitting element 110_G, and the blue light emitting element 110_B. The red light emitting element 110_R is used to emit the red light beam L1_R, the green light emitting element 110_G is used to emit the green light beam L1_G, the blue light emitting element 110_B is used to emit the blue light beam L1_B, and the first light beam L1 is at least one of the red light beam L1_R, the green light beam L1_G, and the blue light beam L1_B. For example, in this embodiment, the first light source module 110 is a combination of a red light emitting element 110_R, a green light emitting element 110_G, and a blue light emitting element 110_B, and the first light beam L1 includes a red light beam L1_R, a green light beam L1_G, and a blue light beam L1_B. More specifically, the red light emitting element 110_R, the green light emitting element 110_G, and the blue light emitting element 110_B are one or more laser diodes (LD). In other embodiments, the first light source module 110 includes, for example, a red light emitting element 110_R and a green light emitting element 110_G, and the first light beam L1 includes at least one of a red light beam L1_R and a green light beam L1_G.

The second light source module 120 is used to provide a second light beam L2. In detail, the second light source module 120 includes an excitation light source 122 and a wavelength conversion element 124, in which the excitation light source 122 is used to provide the excitation light beam LE. For example, the excitation light source 122 includes, for example, at least one blue laser diode, and the excitation light beam LE is a blue light beam. The wavelength conversion element 124 is disposed on the transmission path of the excitation light beam LE, and is used to convert the excitation light beam LE from the excitation light source 122 into an excited light beam. A wavelength conversion material is disposed on the wavelength conversion element, and the blue excitation light beam LE excites the wavelength conversion material to be converted into a yellow light beam or a green light beam. The second light beam L2 includes at least one of the excitation light beam LE and the excited light beam. The following description takes the excited light beam as an example. In this embodiment, the second light beam L2 is an excited light beam.

In this embodiment, the second light source module 120 further includes a dichroic element 126 disposed on the transmission path of the excitation light beam LE from the excitation light source 122 for reflecting the excitation light beam LE and allowing the excited light beam to pass through. The dichroic element 126 is, for example, a dichroic mirror with blue light reflection (DMB). In other embodiments, the dichroic element 126 can be used to allow the excitation light beam LE to pass through and reflect the excited light beam. In this embodiment, the dichroic element 126 and the beam splitting element 130 are disposed in parallel, so the difficulty of assembly can be simplified. On the other hand, in this embodiment, the wavelength conversion element 124 of the first light source module 110 and the second light source module 120 are disposed adjacent to each other, and a light emitting direction of the first light beam L1 of the first light source module 110 and a light emitting surface of the wavelength conversion element 124 are mutually perpendicular. Therefore, the first light source module 110 and the wavelength conversion element 124 can share the same heat dissipation device for heat dissipation. In this way, space can be saved.

The beam splitting element 130 is disposed on the transmission path of the first light beam L1 and the second light beam L2, in which the beam splitting element 130 is a partially transmissive and partially reflecting element, such as a 50% transmissive 50% reflecting beam splitting mirror, or a 40% transmissive 60% reflecting beam splitting mirror. The actual transmission and reflection ratios varies according to different lighting systems, the present invention is not limited thereto. In this embodiment, the beam splitting element 130 is a 50% transmissive 50% reflecting beam splitting mirror and has a first side S1 and a second side S2 opposite to each other. The first light beam L1 and the second light beam L2 are respectively incident to the beam splitting element 130 from the first side S1 and the second side S2 of the beam splitting element 130. In the embodiment shown in FIG. 2, the beam splitting element 130 is, for example, configured to have an included angle with the incident direction of the second light beam L2 from the second light source module 120. The included angle is formed between the second light beam L2 and a surface of the beam splitting element 130 that the second light beam L2 is incident on. The second side S2 of the beam splitting element 130 is, for example, the surface facing the second light source module 120, and the first side S1 is, for example, the surface facing away from the second light source module 120. The beam splitting element 130 guides a first portion of the first light beam L1 to be output from the first side S1 and transmitted along a first light path D1 to be incident on the light homogenizing element 150, and guides a second portion of the first light beam L1 to be output from the second side S2 and transmitted along a second light path D2 to be incident on the light homogenizing element 150. On the other hand, the beam splitting element 130 further guides a first portion of the second light beam L2 to be output from the first side S1 and transmitted along the first light path D1 to be incident on the light homogenizing element 150, and guides a second portion of the second light beam L2 to be output from the second side S2 and transmitted along the second light path D2 to be incident on the light homogenizing element 150. In other words, if the first light source module 110 and the second light source module 120 are turned on at the same time, the first portion of the first light beam L1 and the first portion of the second light beam L2 outputted from the beam splitting element 130 are mixed into one light beam on the first light path D1, and the second portion of the first light beam L1 and the second portion of the second light beam L2 outputted from the beam splitting element 130 are mixed into one light beam on the second light path D2. Therefore, when the first light beam L1 and the second light beam L2 are transmitted to the beam splitting element 130, two light beams with the same wavelength composition and the same energy are respectively incident on two different positions of the light condensing element 140 along different light paths. In different embodiments, the first light source module 110 and the second light source module 120 can be selectively turned on in turn or at intervals at different timings, but the present invention is not limited thereto.

In this embodiment, the lighting system 100 further includes a reflecting element 170, such as a reflecting mirror, disposed on the first light path D1 between the beam splitting element 130 and the light condensing element 140 to reflect the first portion of the first light beam L1, so that the first portion of the first light beam L1 output from the first side S1 of the beam splitting element 130 and the second portion of the first light beam L1 output from the second side S2 of the beam splitting element 130 are transmitted to the light condensing element 140 in parallel. In addition, in this embodiment, the reflecting element 170 is also disposed on the transmission path of the first light beam L1 emitted from the first light source module 110. After the first light beam L1 from the first light source module 110 is reflected by the reflecting element 170 to the first side S1 of the beam splitting element, the first portion of the first light beam L1 guided by the beam splitting element 130 and output from the first side S1 is reflected by the same reflecting element 170 to the light condensing element 140, as shown in FIG. 2. In this embodiment, the dichroic element 126, the beam splitting element 130, and the reflecting element 170 are all disposed in parallel. Therefore, the difficulty of assembling the lighting system 100 can be reduced.

The light condensing element 140 is, for example, an optical lens with a positive refractive index, and includes a central axis C and a first portion P1 and a second portion P2 located on both sides of the central axis C. The first portion P1 of the light condensing element 140 is located on the first light path D1 between the beam splitting element 130 and the light homogenizing element 150, and the second portion P2 of the light condensing element 140 is located on the second light path D2 between the beam splitting element 130 and the light homogenizing element 150. Specifically, in this embodiment, the position where the first light path D1 passes through the first portion P1 of the light condensing element 140 and the position where the second light path D2 passes through the second portion P2 of the light condensing element are equidistant from the central axis C. Therefore, after the light beam transmitted on the first light path D1 and the light beam transmitted on the second light path D2 pass through the light condensing element 140, they are condensed toward the central axis C by the optical effect of the light condensing element 140 to enter the light homogenizing element 150.

The light homogenizing element 150 is disposed on the transmission path of the light beam from the light condensing element 140 and outputs the lighting beam LB. The light homogenizing element 150 is used to adjust the light spot shape of the light beam, so that the light spot shape of the output lighting beam LB can match the shape of the working area of the light valve 60 (i.e., a rectangle), and that the light spot has the same or close light intensity everywhere, such that the light intensity of the lighting beam LB is homogeneous. In this embodiment, the light homogenizing element 150 is, for example, an integration rod, but in other embodiments, the light homogenizing element 150 may also be an optical element of other suitable forms, such as a lens array (fly eye lens array), the present invention is not limited thereto. Preferably, the central axis C of the light condensing element 140 overlaps with the center of the light homogenizing element 150.

In this way, with the cooperation of the above-mentioned optical elements, the lighting system 100 of this embodiment can avoid the energy loss caused by disposing the dichroic mirrors on the paths of the first light beam L1 and the second light beam L2 under the optical structure with the fill light source (i.e., the first light source module 110 of this embodiment), thereby the light emission efficiency and optical effect of the lighting system 100 can be improved. In addition, the lighting system 100 of this embodiment can improve the étendue, thereby improving the homogeneity of the projection image generated by the projection device 10. On the other hand, the first light source module 110 as the fill light source can be conveniently designed to be composed of different light emitting elements according to different situations. Alternatively, it is convenient to simply remove the first light source module 110 or the second light source module 120 according to different situations, so as to be used as a single type of light source projection device 10. In another embodiment, the first light source module 110 and the second light source module 120 can be designed as the same type of light source, thereby achieving a lighting system 100 with improved brightness.

Figure 3:
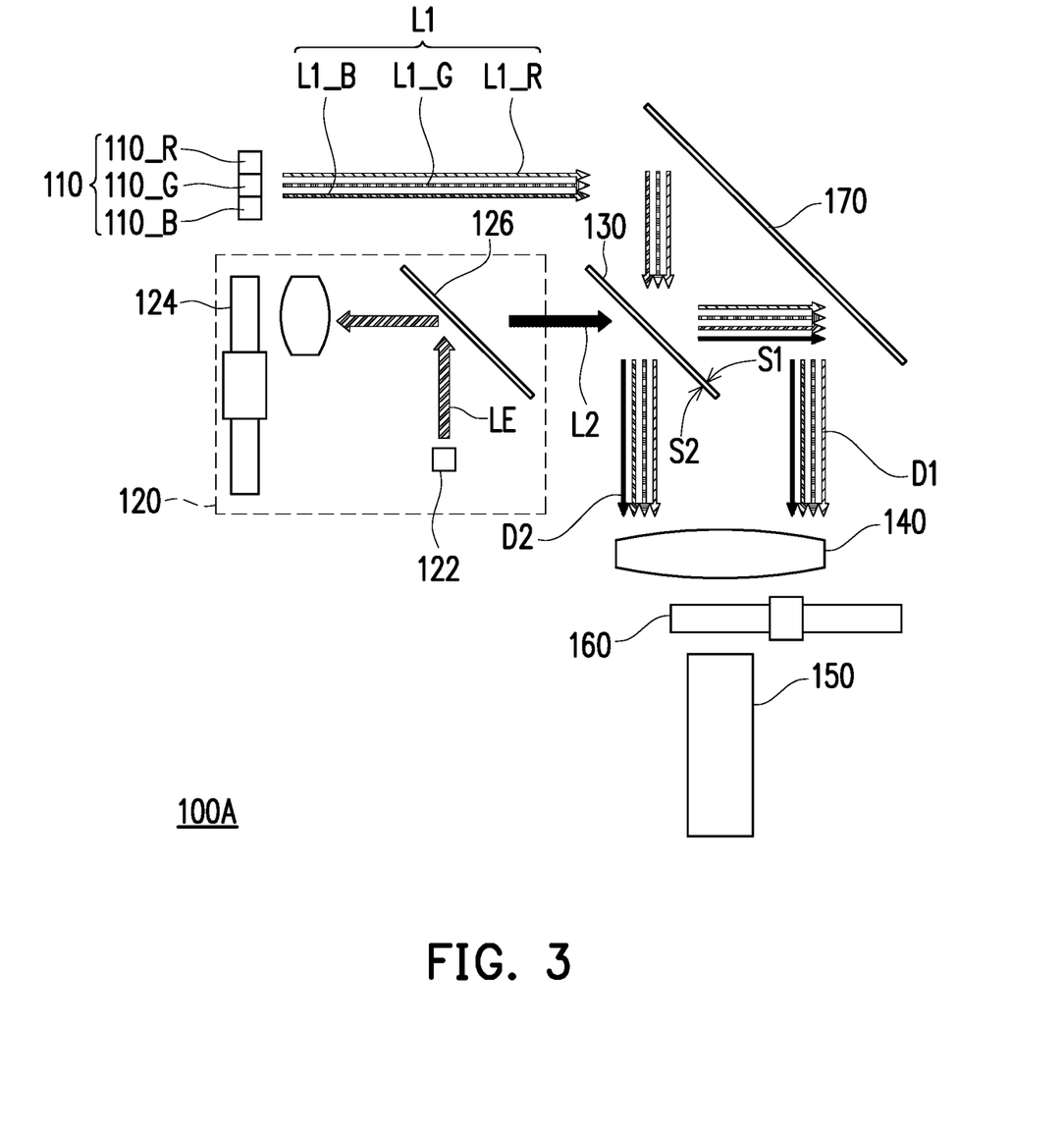
FIG. 3 is a schematic diagram of a lighting system according to another embodiment of the present invention.

FIG. 3 is a schematic diagram of a lighting system according to another embodiment of the present invention. Referring to FIG. 3, a lighting system 100A of this embodiment is similar to the lighting system 100 shown in FIG. 2. The difference between the two is that, in this embodiment, the lighting system 100A further includes a filter element 160, which is disposed between the light condensing element 140 and the light homogenizing element 150, and is located on the first light path D1 and the second light path D2. The filter element 160 is used to sequentially select some of the light beams of different wavelength bands to pass through according to different situations or needs.

Figure 4:
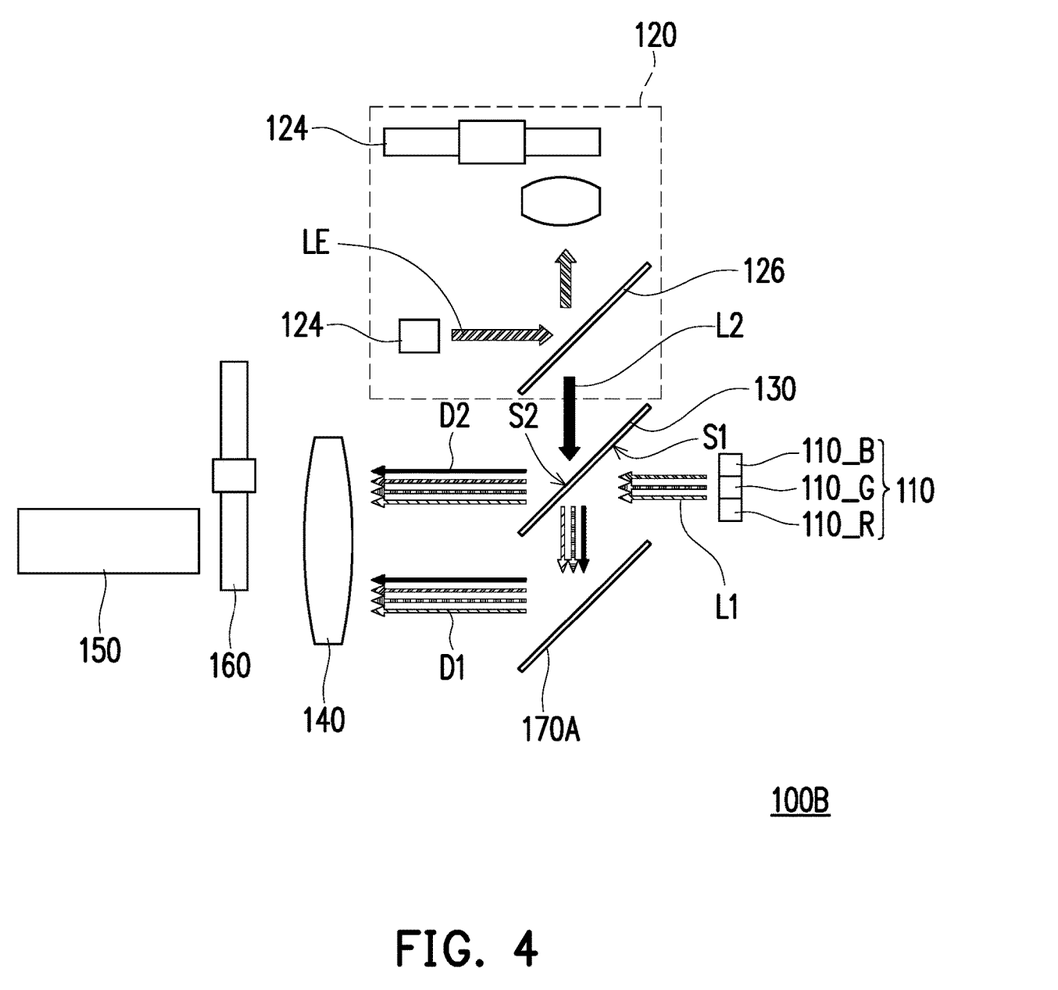
FIG. 4 is a schematic diagram of a lighting system according to another embodiment of the present invention.

FIG. 4 is a schematic diagram of a lighting system according to another embodiment of the present invention. Referring to FIG. 4, a lighting system 100B of this embodiment is similar to the lighting system 100 shown in FIG. 2. The difference between the two is that, in this embodiment, a reflecting element 170A is not located on the transmission path of the first light beam L1 from the first light source module 110. The reflecting element 170A is not disposed on the transmission path of the first light beam L1 provided by the first light source module 110. The first light beam L1 provided by the first light source module 110 is directly incident to the beam splitting element 130. In this way, the area of the reflecting element 170A can be further reduced, thereby saving the space of the lighting system 100B. In addition, since the reflecting element 170A reduces the transmission of the first light beam L1 received once, the energy received by the reflecting element 170A can be reduced, thereby increasing the reliability of the reflecting element 170A. In addition, the filter element 160 as shown in FIG. 3 is additionally disposed in this embodiment. Moreover, in this embodiment, the light emitting direction of the first light beam L1 of the first light source module 110 and the light emitting surface of the wavelength conversion element 124 are mutually parallel. In the embodiment shown in FIG. 4, the beam splitting element 130 is, for example, configured to have an included angle with the incident direction of the second light beam L2 from the second light source module 120, the second side S2 of the beam splitting element 130 is, for example, the surface facing the second light source module 120, and the first side S1 is, for example, the surface facing away from the second light source module 120 and facing the first light source module 110.

Figure 5:
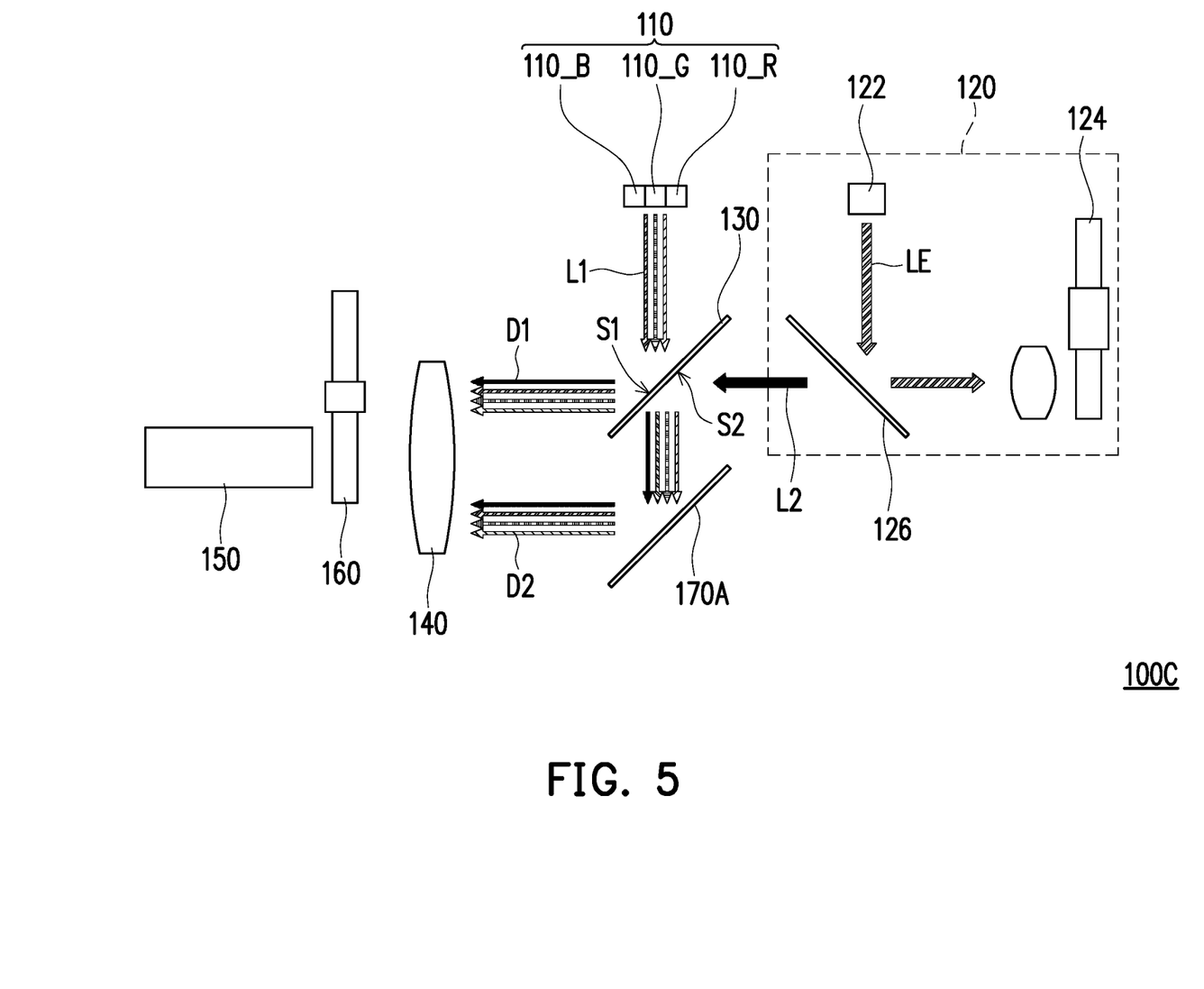
FIG. 5 is a schematic diagram of a lighting system according to another embodiment of the present invention.

FIG. 5 is a schematic diagram of a lighting system according to another embodiment of the present invention. Referring to FIG. 5, a lighting system 100C of this embodiment is similar to the lighting system 100 shown in FIG. 2. The difference between the two is that, in this embodiment, the excitation light source 122 of the first light source module 110 and the second light source module 120 is disposed on the same side of the system. Specifically, the first light source module 110 and the excitation light source 122 are disposed adjacent to each other in the lighting system 100C. In this way, the first light source module 110 and the excitation light source 122 can share the same heat dissipation device for heat dissipation. In this way, space can be saved. In this embodiment, the beam splitting element 130 and the reflecting element 170A or the dichroic element 126 in the second light source module 120 are vertically disposed. The dichroic element 126 of the second light source module 120 reflects the excitation light beam LE and allows the excited light beam to pass through. In addition, the reflecting element 170A is disposed on the second light path D2 between the beam splitting element 130 and the light condensing element 140 to reflect the second portion of the first light beam L1 output from the second side S2 of the beam splitting element 130, so that the second portion of the first light beam L1 and the first portion of the first light beam L1 are transmitted to the light condensing element 140 in parallel, and also to reflect the second portion of the second light beam L2 output from the second side S2 of the beam splitting element 130, so that the second portion of the second light beam L2 and the first portion of the second light beam L2 are transmitted to the light condensing element 140 in parallel. In addition, the filter element 160 as shown in FIG. 3 is additionally disposed in this embodiment.

Figure 6:
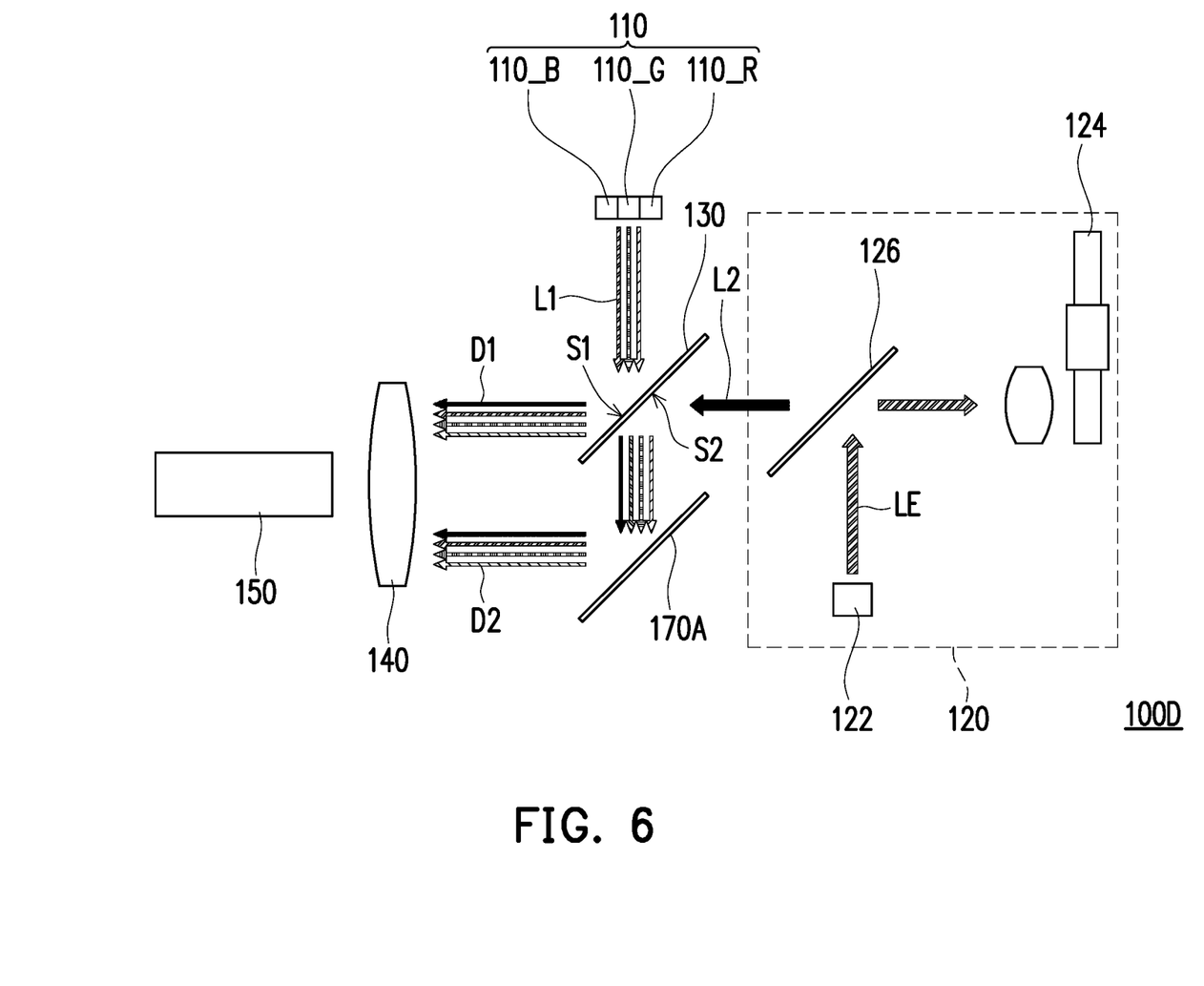
FIG. 6 is a schematic diagram of a lighting system according to another embodiment of the present invention.

FIG. 6 is a schematic diagram of a lighting system according to another embodiment of the present invention. Referring to FIG. 6, a lighting system 100D of this embodiment is similar to the lighting system 100 shown in FIG. 5. The difference between the two is that, in this embodiment, the excitation light source 122 in the second light source module 120 is disposed in another side of the dichroic element 126 relative to the excitation light source 122 in FIG. 5. Therefore, in this embodiment, the dichroic element 126, the beam splitting element 130, and the reflecting element 170A are all disposed in parallel, which can reduce the difficulty of assembling the lighting system 100D. In addition, the filter element 160 as shown in FIG. 5 is omitted in this embodiment.

Figure 7:
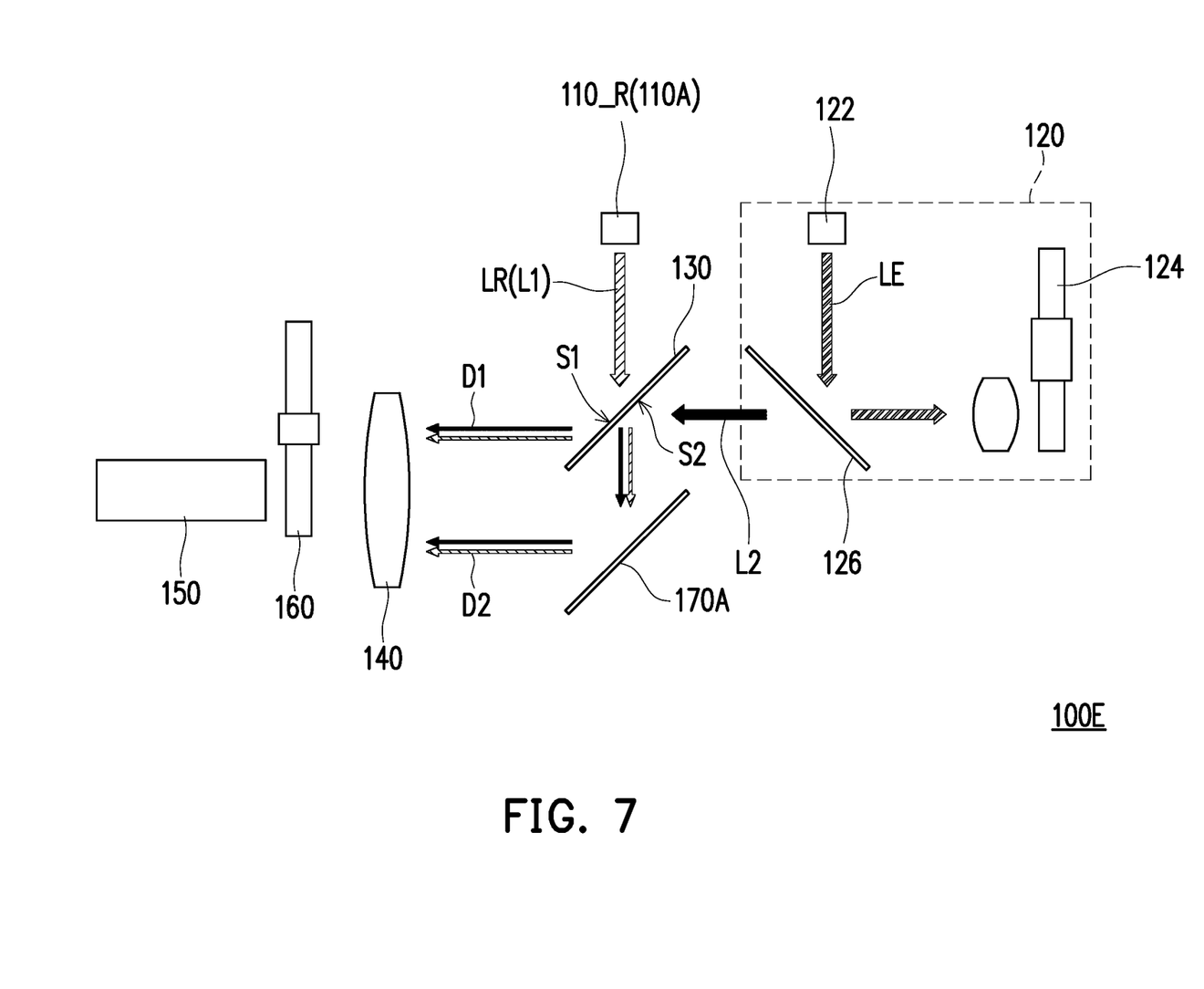
FIG. 7 is a schematic diagram of a lighting system according to another embodiment of the present invention.
Figure 8:
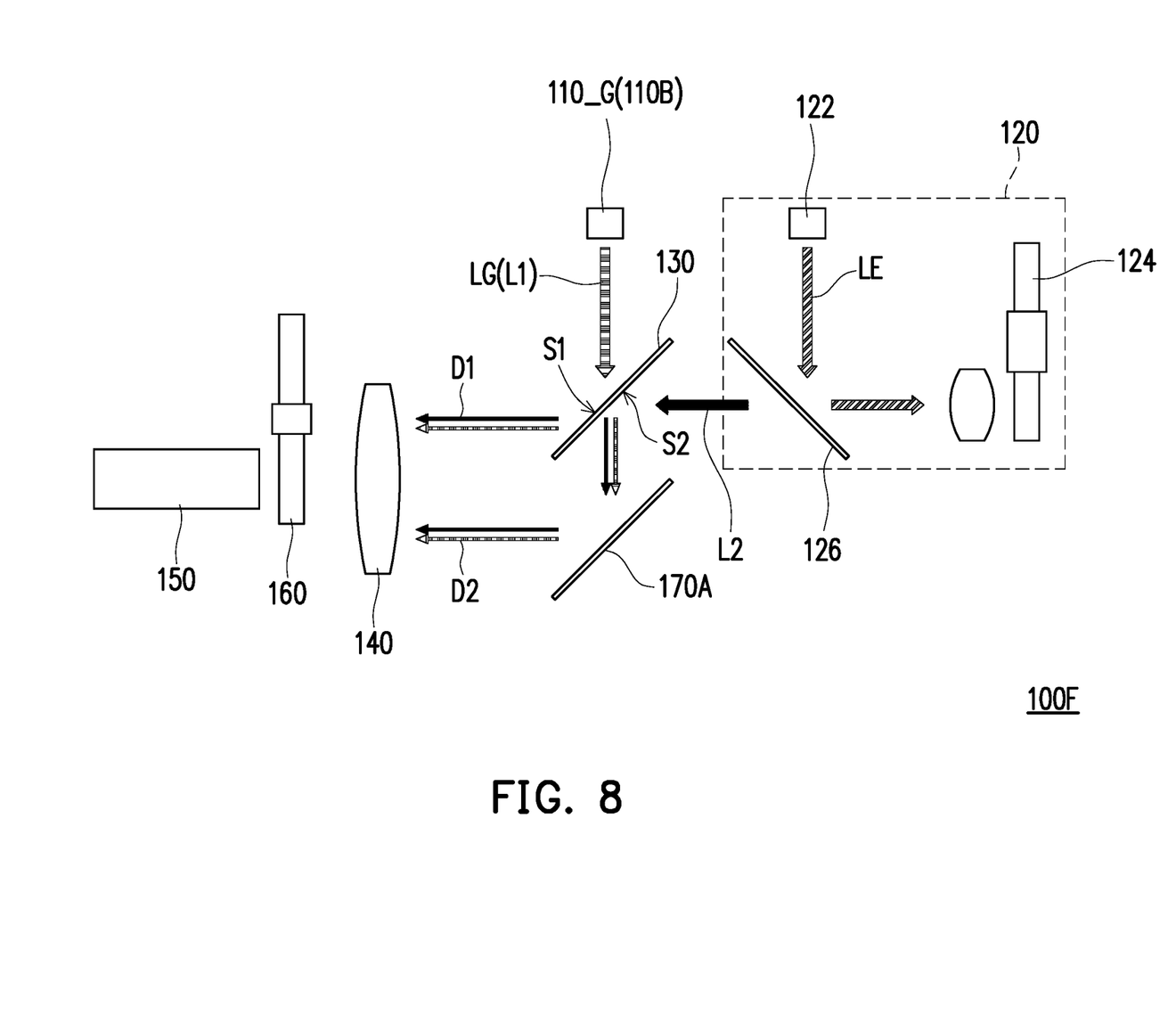
FIG. 8 is a schematic diagram of a lighting system according to another embodiment of the present invention.
Figure 9:
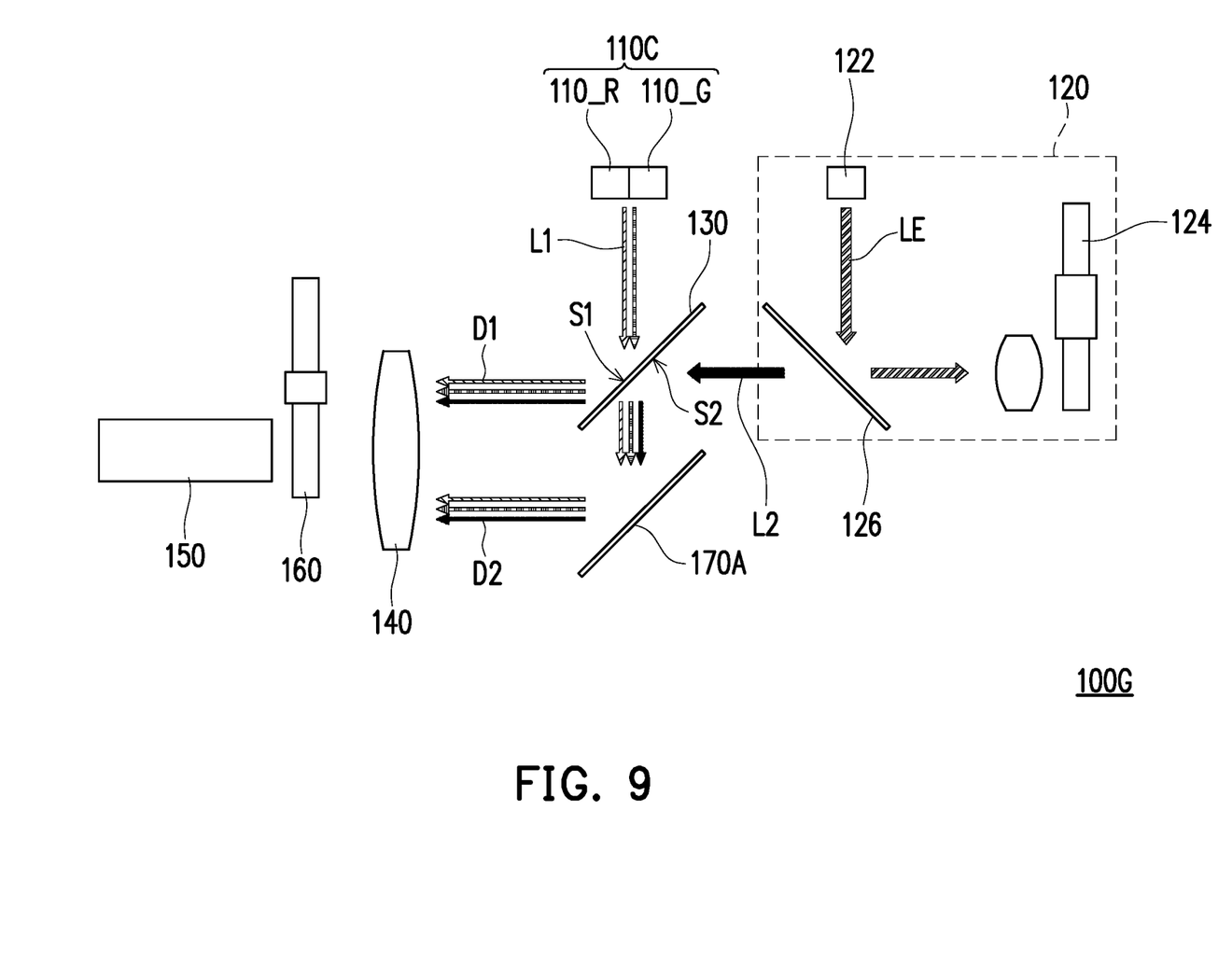
FIG. 9 is a schematic diagram of a lighting system according to another embodiment of the present invention.

FIG. 7 is a schematic diagram of a lighting system according to another embodiment of the present invention. FIG. 8 is a schematic diagram of a lighting system according to another embodiment of the present invention. FIG. 9 is a schematic diagram of a lighting system according to another embodiment of the present invention. Referring to FIG. 7 to FIG. 9, the lighting systems 100E, 100F, 100G of these embodiments are similar to the lighting system 100C shown in FIG. 5. The only difference is that, in these embodiments, the first light source module 110 is a red light emitting element 110_R, a green light emitting element 110_G, or a combination of the two, and the first light beam L1 is a red light beam L1_R, a green light beam L1_G, or a combination of the two. In the embodiment of FIG. 7, the first light source module 110A of the lighting system 100E is a red light emitting element 110_R, and the first light beam L1 is a red light beam L1_R. In the embodiment of FIG. 8, the first light source module 110B of the lighting system 10F is a green light emitting element 110_G, and the first light beam L1 is a green light beam L1_G. In the embodiment of FIG. 9, the first light source module 110C of the lighting system 100G is a combination of the red light emitting element 110_R and the green light emitting element 110_G, and the first light beam L1 includes at least one of the red light beam L1_R and the green light beam L1_G. As such, the lighting systems 100E, 100F, and 100G of these embodiments can be further applied in different situations.

Figure 10:
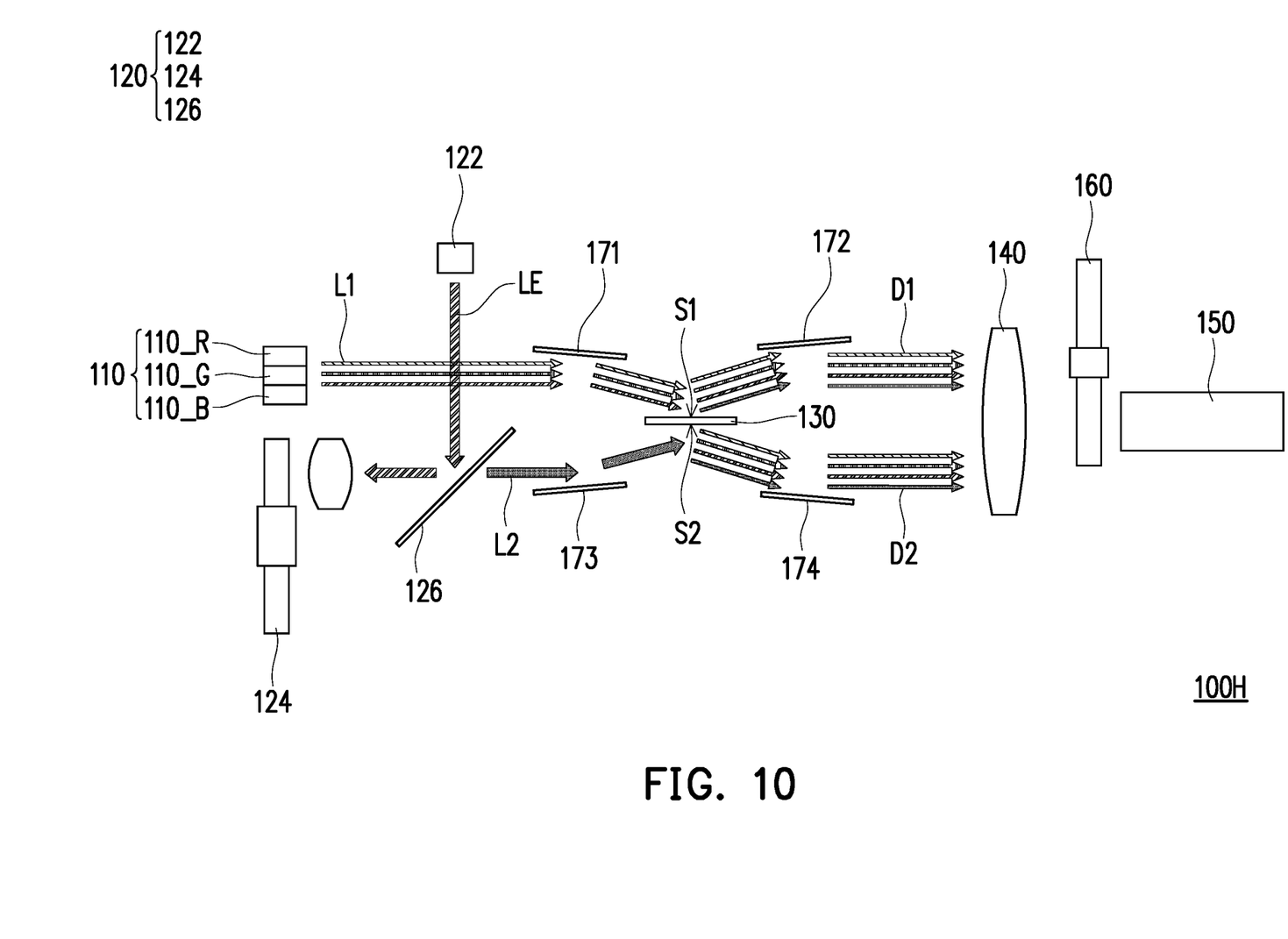
FIG. 10 is a schematic diagram of a lighting system according to another embodiment of the present invention.

FIG. 10 is a schematic diagram of a lighting system according to another embodiment of the present invention. Referring to FIG. 10, alighting system 100H of this embodiment is similar to the lighting system 100 shown in FIG. 2. The difference between the two is that in this embodiment, the lighting system 100H further includes a first reflecting mirror 171, a second reflecting mirror 172, a third reflecting mirror 173, and a fourth reflecting mirror 174 to replace the reflecting element 170 shown in FIG. 2. The first reflecting mirror 171 is disposed on the transmission path of the first light beam L1 from the first light source module 110, and is used to reflect the first light beam L1 to the first side S1 of the beam splitting element 130. The second reflecting mirror 172 is disposed on the first light path D1 between the beam splitting element 130 and the light condensing element 140, and is used to reflect at least one of the first portion of the first light beam L1 and the first portion of the second light beam from the beam splitting element 130 to the light condensing element 140. The third reflecting mirror 173 is disposed on the transmission path of the second light beam L2 from the second light source module 120, and is used to reflect the second light beam L2 to the second side S2 of the beam splitting element 130. The fourth reflecting mirror 174 is disposed on the second light path D2 between the beam splitting element 130 and the light condensing element 140, and is used to reflect at least one of the second portion of the first light beam L1 and the second portion of the second light beam L2 from the beam splitting element 130 to the light condensing element 140. Therefore, in this embodiment, none of the first reflecting mirror 171, the second reflecting mirror 172, the third reflecting mirror 173, and the fourth reflecting mirror 174 are parallel to the beam splitting element 130 and the dichroic element 126. In addition, the filter element 160 as shown in FIG. 3 is additionally disposed in this embodiment. In the embodiment shown in FIG. 10, the beam splitting element 130 is, for example, configured to have an included angle with the incident direction of the first light beam L1 from the first reflecting mirror 171 and another included angle with the incident direction of the second light beam L2 from the third reflecting mirror 173. The second side S2 is, for example, the surface on which the second light beam L2 is incident to the beam splitting element 130, and the first side S1 is, for example, the surface on which the first light beam L1 is incident to the beam splitting element 130.

Figure 11:
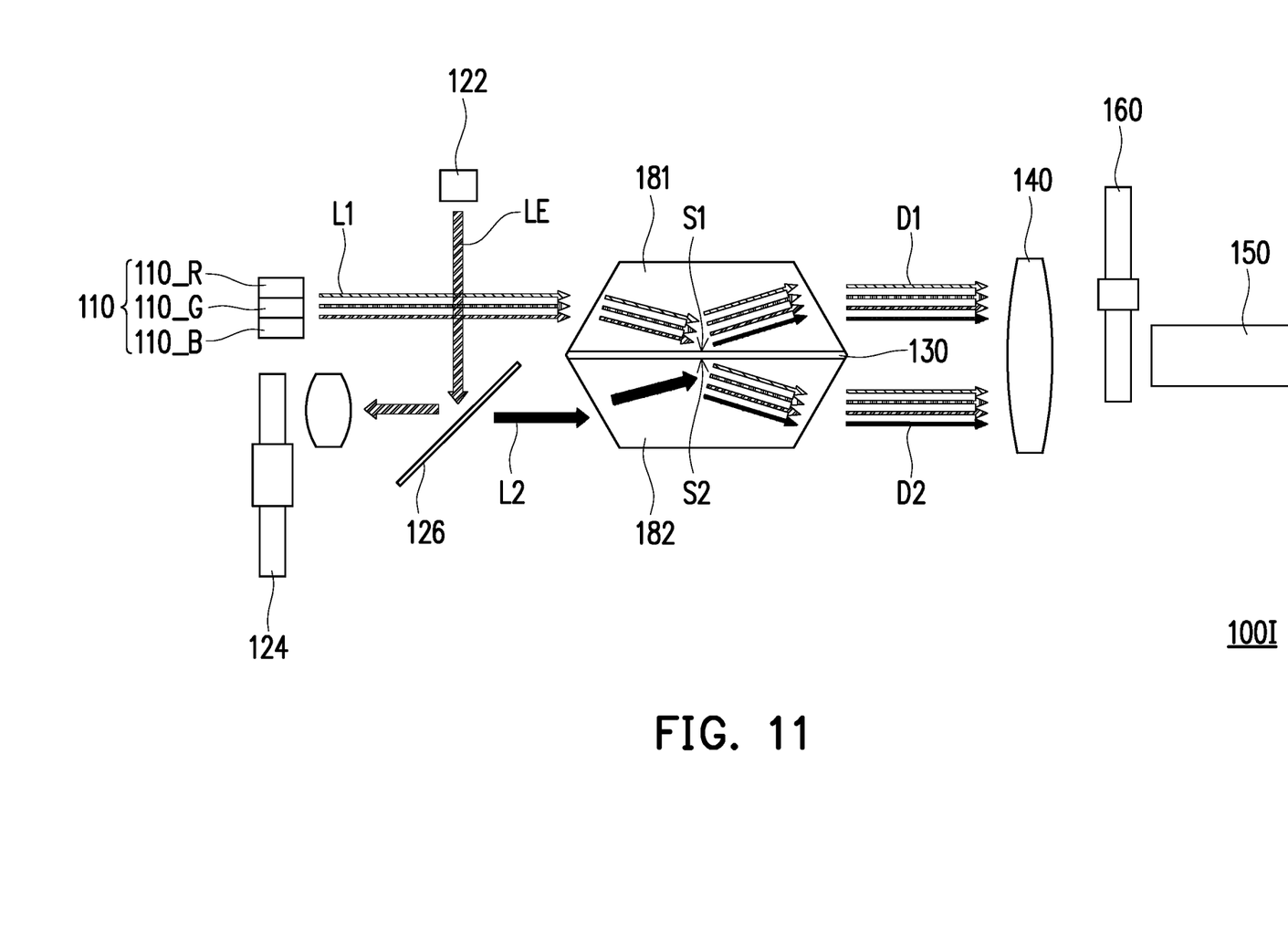
FIG. 11 is a schematic diagram of a lighting system according to another embodiment of the present invention.

FIG. 11 is a schematic diagram of a lighting system according to another embodiment of the present invention. Referring to FIG. 11, a lighting system 100I of this embodiment is similar to the lighting system 100H shown in FIG. 10. The difference between the two is that, in this embodiment, the lighting system 100I includes a first prism 181 and a second prism 182 to replace the first reflecting mirror 171, the second reflecting mirror 172, the third reflecting mirror 173, and the fourth reflecting mirror 174 shown in FIG. 10. The beam splitting element 130 is disposed between the first prism 181 and the second prism 182. The first prism 181 is disposed on the transmission path of the first light beam L1 from the first light source module 110 to refract the first light beam L1 incident into the first prism 181 to the first side S1 of the beam splitting element 130, and at least one of the first portion of the first light beam L1 and the first portion of the second light beam L2 from the beam splitting element 130 is refracted and transmitted to the light condensing element 140 when leaving the first prism 181. The second prism is disposed on the transmission path of the second light beam L2 from the second light source module 120 to refract the second light beam L2 incident into the second prism 182 to the second side S2 of the beam splitting element 130, and at least one of the second portion of the first light beam L1 and the second portion of the second light beam L2 from the beam splitting element 130 is refracted and transmitted to the light condensing element 140 when leaving the second prism 182. For example, the first prism 181 and the second prism 182 are dove prisms, and the beam splitting element 130 can be a 50% transmissive 50% reflecting beam splitting mirror between two dove prisms or a 50% transmissive 50% reflecting coating, the present invention is not limited thereto. In this way, the lighting system 100I of this embodiment can avoid the energy loss caused by disposing the dichroic mirrors on the paths of the first light beam L1 and the second light beam L2 under the optical structure with the fill light source, thereby improving the light emission efficiency and optical effect of the lighting system 100I.

To sum up, in the lighting system and the projection device of the present invention, the lighting system includes a first light source module, a second light source module, a beam splitting element, a light condensing element, and a light homogenizing element. The first light source module and the second light source module respectively provide the first light beam and the second light beam and are respectively transmitted by the opposite first side and the second side of the beam splitting element to generate a transmissive portion and a reflecting portion. The first portion of the first light beam and the first portion of the second light beam are output from the first side and transmitted to the light condensing element along the first light path. The second portion of the first light beam and the second portion of the second light beam are output from the second side and transmitted to the light condensing element along the second light path. The light beam transmitted along the first light path and the light beam transmitted along the second light path are incident on the opposite two portions of the light condensing element, and subsequently may be symmetrically transmitted by the light condensing element to the light homogenizing element to output the lighting beam. In this way, through the cooperation of the above-mentioned optical elements, the lighting system can avoid the energy loss caused by disposing the dichroic mirrors on the paths of the first light beam and the second light beam under the optical structure with the fill light source, thereby improving the light emission efficiency and optical effect of the lighting system.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby enabling persons skilled in the art in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A lighting system, for providing a lighting beam, the lighting system comprising a first light source module, a second light source module, a beam splitting element, a light condensing element, and a light homogenizing element, wherein the first light source module is used to provide a first light beam;

the second light source module is used to provide a second light beam, the second light source module comprises an excitation light source and a wavelength conversion element, wherein the excitation light source is used to provide an excitation light beam, the wavelength conversion element is disposed on a transmission path of the excitation light beam, and is used to convert the excitation light beam into an excited light beam, the second light beam comprises at least one of the excitation light beam and the excited light beam;

the beam splitting element is disposed on a transmission path of the first light beam and the second light beam, wherein the beam splitting element is a partially transmissive and partially reflecting element and has a first side and a second side opposite to each other, wherein the beam splitting element is used to guide a first portion of the first light beam to be output from the first side and transmitted along a first light path to be incident on the light homogenizing element, and to guide a second portion of the first light beam to be output from the second side and transmitted along a second light path to be incident on the light homogenizing element, the beam splitting element is used to guide a first portion of the second light beam to be output from the first side and transmitted along the first light path to be incident on the light homogenizing element, and to guide a second portion of the second light beam to be output from the second side and transmitted along the second light path to be incident on the light homogenizing element;

the light condensing element comprises a central axis, and a first portion and a second portion located on both sides of the central axis, the first portion of the light condensing element is located on the first light path between the beam splitting element and the light homogenizing element, the second portion of the light condensing element is located on the second light path between the beam splitting element and the light homogenizing element; and the light homogenizing element is used to output the lighting beam.

2. The lighting system according to claim 1, wherein the first light beam and the second light beam are respectively incident to the beam splitting element from the first side and the second side of the beam splitting element.

3. The lighting system according to claim 1, wherein a position where the first light path passes through the first portion of the light condensing element and a position where the second light path passes through the second portion of the light condensing element are equidistant from the central axis.

4. The lighting system according to claim 3, wherein the central axis of the light condensing element overlaps a center of the light homogenizing element.

5. The lighting system according to claim 1, wherein the second light source module further comprises a dichroic element, disposed on the transmission path of the excitation light beam for reflecting the excitation light beam and allowing the excited light beam to pass through.

6. The lighting system according to claim 5, wherein the dichroic element and the beam splitting element are disposed in parallel.

7. The lighting system according to claim 1, wherein the first light source module is a combination of a red light emitting element, a green light emitting element, and a blue light emitting element, and the first light beam comprises a red light beam, a green light beam, and a blue light beam.

8. The lighting system according to claim 7, wherein the red light emitting element, the green light emitting element, or the blue light emitting element of the first light source module is a laser diode.

9. The lighting system according to claim 1, wherein the first light source module is a red light emitting element, a green light emitting element, or a combination of the two, and the first light beam is a red light beam, a green light beam, or a combination of the two.

10. The lighting system according to claim 9, wherein the red light emitting element, the green light emitting element, or the blue light emitting element of the first light source module is a laser diode.

11. The lighting system according to claim 1, wherein a light emitting direction of the first light source module and a light emitting surface of the wavelength conversion element are mutually perpendicular.

12. The lighting system according to claim 1, wherein a light emitting direction of the first light source module and a light emitting direction of the excitation light source are mutually parallel.

13. The lighting system according to claim 1, wherein the lighting system further comprises a reflecting element, disposed on the first light path between the beam splitting element and the light condensing element to reflect the first portion of the first light beam, so that the first portion of the first light beam and the second portion of the first light beam are transmitted to the light condensing element in parallel.

14. The lighting system according to claim 13, wherein the dichroic element, the beam splitting element, and the reflecting element are all disposed in parallel.

15. The lighting system according to claim 1, wherein the reflecting element is disposed on the transmission path of the first light beam from the first light source module to reflect the first light beam to the first side of the beam splitting element.

16. The lighting system according to claim 1, wherein the lighting system further comprises a reflecting element, disposed on the second light path between the beam splitting element and the light condensing element to reflect the second portion of the first light beam, so that the second portion of the first light beam and the first portion of the first light beam are transmitted to the light condensing element in parallel.

17. The lighting system according to claim 1, wherein the lighting system further comprises a first reflecting mirror, a second reflecting mirror, a third reflecting mirror, and a fourth reflecting mirror, wherein
the first reflecting mirror is disposed on the transmission path of the first light beam to reflect the first light beam to the first side of the beam splitting element;
the second reflecting mirror is disposed on the first light path to reflect at least one of the first portion of the first light beam and the first portion of the second light beam to the light condensing element;
the third reflecting mirror is disposed on the transmission path of the second light beam to reflect the second light beam to the second side of the beam splitting element; and
the fourth reflecting mirror is disposed on the second light path to reflect at least one of the second portion of the first light beam and the second portion of the second light beam to the light condensing element.

18. The lighting system according to claim 1, wherein the lighting system further comprises a first prism and a second prism, the beam splitting element is disposed between the first prism and the second prism; wherein
the first prism is disposed on the transmission path of the first light beam to refract the first light beam to the first side of the beam splitting element, and at least one of the first portion of the first light beam and the first portion of the second light beam is refracted to the light condensing element; and
the second prism is disposed on the transmission path of the second light beam to refract the second light beam to the second side of the beam splitting element, and at least one of the second portion of the first light beam and the second portion of the second light beam is refracted to the light condensing element.

19. The lighting system according to claim 1, wherein the lighting system further comprises a filter element disposed between the light condensing element and the light homogenizing element, and located on the first light path and the second light path.

20. The lighting system according to claim 1, wherein the first light source module and the excitation light source are disposed adjacent to each other in the lighting system.

21. A projection device, comprising a lighting system, at least one light valve, and a projection lens, wherein
the lighting system is used to provide a lighting beam, the lighting system comprises a first light source module, a second light source module, a beam splitting element, a light condensing element, and a light homogenizing element, wherein
the first light source module is used to provide a first light beam;
the second light source module is used to provide a second light beam, the second light source module comprises an excitation light source and a wavelength conversion element, wherein the excitation light source is used to provide an excitation light beam, the wavelength conversion element is disposed on a transmission path of the excitation light beam, and is used to convert the excitation light beam into an excited light beam, the second light beam comprises at least one of the excitation light beam and the excited light beam;

the beam splitting element is disposed on a transmission path of the first light beam and the second light beam, wherein the beam splitting element is a partially transmissive and partially reflecting element and has a first side and a second side opposite to each other, wherein the beam splitting element is used to guide a first portion of the first light beam to be output from the first side and transmitted along a first light path to be incident on the light homogenizing element, and to guide a second portion of the first light beam to be output from the second side and transmitted along a second light path to be incident on the light homogenizing element, the beam splitting element is used to guide a first portion of the second light beam to be output from the first side and transmitted along the first light path to be incident on the light homogenizing element, and to guide a second portion of the second light beam to be output from the second side and transmitted along the second light path to be incident on the light homogenizing element;

the light condensing element comprises a central axis, and a first portion and a second portion located on both sides of the central axis, the first portion of the light condensing element is located on the first light path between the beam splitting element and the light homogenizing element, the second portion of the light condensing element is located on the second light path between the beam splitting element and the light homogenizing element; and the light homogenizing element is used to output the lighting beam;

the at least one light valve is disposed on a transmission path of the lighting beam for converting the lighting beam into an image beam; and the projection lens is disposed on a transmission path of the image beam to project the image beam out of the projection device.

\* \* \* \* \*